United States Patent
Gatzemeyer et al.

(10) Patent No.: US 10,582,764 B2
(45) Date of Patent: Mar. 10, 2020

(54) ORAL CARE SYSTEM AND METHOD

(71) Applicant: COLGATE-PALMOLIVE COMPANY, New York, NY (US)

(72) Inventors: John Gatzemeyer, Hillsborough, NJ (US); Andrew Brent Lintott, Sutton (GB); Ian Joseph Smallman, Cambridge (GB)

(73) Assignee: Colgate-Palmolive Company, New York, NY (US)

( * ) Notice: Subject to any disclaimer, the term of this patent is extended or adjusted under 35 U.S.C. 154(b) by 374 days.

(21) Appl. No.: 15/350,254

(22) Filed: Nov. 14, 2016

(65) Prior Publication Data

US 2018/0132604 A1    May 17, 2018

(51) Int. Cl.
*A46B 15/00* (2006.01)
*A46B 5/02* (2006.01)
*A46B 9/04* (2006.01)
*G09B 19/00* (2006.01)

(52) U.S. Cl.
CPC .......... *A46B 15/0044* (2013.01); *A46B 5/026* (2013.01); *A46B 9/04* (2013.01); *A46B 15/0006* (2013.01); *A46B 15/0012* (2013.01); *G09B 19/0084* (2013.01)

(58) Field of Classification Search
CPC ....... A46B 15/0044; A46B 5/026; A46B 9/04; A46B 15/0006; A46B 15/0012
See application file for complete search history.

(56) References Cited

U.S. PATENT DOCUMENTS

| | | | |
|---|---|---|---|
| 5,561,881 A * | 10/1996 | Klinger | A46B 15/0002 15/105 |
| 5,815,872 A | 10/1998 | Meginniss, III et al. | |
| 5,876,207 A | 3/1999 | Sundius et al. | |
| 5,894,620 A | 4/1999 | Polaert et al. | |
| 5,930,858 A | 8/1999 | Jung | |
| 6,314,907 B1 | 11/2001 | Harris et al. | |
| 6,326,884 B1 | 12/2001 | Wohlrabe | |
| 6,327,734 B1 | 12/2001 | Meginniss, III et al. | |
| 6,425,295 B1 | 7/2002 | Meginnis | |
| 6,453,497 B1 | 9/2002 | Chiang et al. | |
| 6,468,076 B2 | 10/2002 | Kawamura | |
| 6,536,068 B1 | 3/2003 | Yang et al. | |
| 6,611,780 B2 | 8/2003 | Lundell et al. | |
| 6,630,730 B2 | 10/2003 | Grigg | |
| 6,685,471 B1 | 2/2004 | Kawamura et al. | |
| 6,735,802 B1 | 5/2004 | Lundell et al. | |
| 6,739,012 B2 | 5/2004 | Grez et al. | |
| 6,786,732 B2 | 9/2004 | Savill et al. | |

(Continued)

FOREIGN PATENT DOCUMENTS

| | | |
|---|---|---|
| AU | 2001252198 A1 | 9/2002 |
| CN | 204393684 U | 6/2015 |

(Continued)

*Primary Examiner* — Shay Karls

(57) ABSTRACT

An oral care system may include: an oral care device including: at least one teeth cleaning element; and at least one sensor configured to detect a brushing intensity during a brushing routine of a user and to generate sensor data corresponding to the detected brushing intensity; and a programmable processor configured to: receive the sensor data generated by the at least one sensor; and determine a target brushing time based on the sensor data.

18 Claims, 9 Drawing Sheets

(56) References Cited

U.S. PATENT DOCUMENTS

| | | |
|---|---|---|
| 7,120,960 B2 | 10/2006 | Kilscher et al. |
| 7,264,026 B2 | 9/2007 | Gruber et al. |
| 7,411,511 B2 | 8/2008 | Kennish et al. |
| 7,682,153 B2 | 3/2010 | Hilfinger et al. |
| 7,748,069 B2 | 7/2010 | Dawley |
| 7,774,886 B2 | 8/2010 | Hilscher et al. |
| 7,976,388 B2 | 7/2011 | Park et al. |
| 8,065,164 B2 | 11/2011 | Hwang |
| 8,161,792 B2 | 4/2012 | Schlueter et al. |
| 8,171,591 B2 | 5/2012 | Hall et al. |
| 8,172,574 B2 | 5/2012 | Hilfinger et al. |
| 8,175,840 B2 | 5/2012 | Hwang et al. |
| 8,214,958 B2 | 7/2012 | Pinyayev et al. |
| 8,218,711 B2 | 7/2012 | Neyer |
| 8,256,979 B2 | 9/2012 | Hilscher et al. |
| 8,272,091 B2 | 9/2012 | Hwang et al. |
| 8,332,186 B2 | 12/2012 | Bates et al. |
| 8,337,213 B2 | 12/2012 | Puurunen et al. |
| 8,381,571 B2 | 2/2013 | Wilhelm et al. |
| 8,393,037 B2 | 3/2013 | Iwahori et al. |
| 8,444,416 B2 | 5/2013 | Chenvainu et al. |
| 8,544,131 B2 | 10/2013 | Braun et al. |
| 8,595,882 B2 | 12/2013 | Bax et al. |
| 8,690,579 B2 | 4/2014 | Ikkink et al. |
| 8,744,192 B2 | 6/2014 | Ortins et al. |
| 8,769,758 B2 | 7/2014 | Jungnickel et al. |
| 8,789,227 B2 | 7/2014 | Cook et al. |
| 8,801,763 B2 | 8/2014 | Fish et al. |
| 8,832,895 B2 | 9/2014 | Jungnickel et al. |
| 8,839,476 B2 | 9/2014 | Adachi |
| 8,863,343 B2 | 10/2014 | Iwahori |
| 8,938,839 B2 | 1/2015 | Kitagawa et al. |
| 8,944,813 B2 | 2/2015 | Kotlarchik |
| 8,972,882 B2 | 3/2015 | Berry |
| 9,009,901 B2 | 4/2015 | Doll et al. |
| 9,105,197 B2 | 8/2015 | Meriheinae et al. |
| 9,113,700 B2 | 8/2015 | Bates et al. |
| 9,192,762 B2 | 11/2015 | Doll et al. |
| 9,204,947 B2 | 12/2015 | Bovenkamp et al. |
| 9,223,903 B2 | 12/2015 | Lamb et al. |
| 9,259,302 B2 | 2/2016 | Miller |
| 9,326,594 B2 | 5/2016 | De Vries et al. |
| 9,333,048 B2 | 5/2016 | Li et al. |
| 9,345,408 B2 | 5/2016 | Curry et al. |
| 2003/0115694 A1 | 6/2003 | Pace |
| 2006/0040246 A1 | 2/2006 | Ding et al. |
| 2006/0123570 A1 | 6/2006 | Pace et al. |
| 2007/0027386 A1 | 2/2007 | Such et al. |
| 2007/0105063 A1 | 5/2007 | Pinyayev et al. |
| 2007/0261185 A1 | 11/2007 | Guney et al. |
| 2008/0256725 A1 | 10/2008 | Emge |
| 2008/0295760 A1 | 12/2008 | Wielstra |
| 2009/0007433 A1 | 1/2009 | Hawes et al. |
| 2009/0038639 A1 | 2/2009 | Yetukuri et al. |
| 2009/0070949 A1 | 3/2009 | Sagel et al. |
| 2009/0215015 A1 | 8/2009 | Chu |
| 2009/0241278 A1 | 10/2009 | Lemchen |
| 2009/0271936 A1 | 11/2009 | Walanski et al. |
| 2010/0024143 A1 | 2/2010 | Dickie |
| 2010/0178252 A1 | 7/2010 | Sagel et al. |
| 2010/0269276 A1 | 10/2010 | Faranda et al. |
| 2010/0281636 A1 | 11/2010 | Ortins et al. |
| 2010/0309302 A1 | 12/2010 | Yang |
| 2010/0319145 A1 | 12/2010 | Neyer et al. |
| 2010/0325828 A1* | 12/2010 | Braun ............... A46B 15/0002 15/167.1 |
| 2011/0045778 A1 | 2/2011 | Stratmann et al. |
| 2011/0076638 A1 | 3/2011 | Gottenbos et al. |
| 2011/0081628 A1 | 4/2011 | Alden et al. |
| 2011/0229842 A1 | 9/2011 | Bielfeldt et al. |
| 2011/0247154 A1 | 10/2011 | Driesen et al. |
| 2011/0275424 A1 | 11/2011 | Schmid et al. |
| 2011/0294096 A1 | 12/2011 | deCastro et al. |
| 2011/0297565 A1 | 12/2011 | Stratmann et al. |
| 2012/0005898 A1 | 1/2012 | Molema et al. |
| 2012/0171657 A1 | 7/2012 | Ortins et al. |
| 2012/0246846 A1 | 10/2012 | Hall |
| 2012/0295216 A1 | 11/2012 | Dykes et al. |
| 2013/0080295 A1 | 3/2013 | Dykes et al. |
| 2013/0091642 A1 | 4/2013 | Dykes et al. |
| 2013/0125326 A1 | 5/2013 | Schmid et al. |
| 2013/0125327 A1 | 5/2013 | Schmid et al. |
| 2013/0166220 A1 | 6/2013 | Bates et al. |
| 2013/0180061 A1 | 7/2013 | Simeth et al. |
| 2013/0188112 A1 | 7/2013 | Vetter |
| 2013/0203008 A1 | 8/2013 | Kressman et al. |
| 2013/0204597 A1 | 8/2013 | Depta et al. |
| 2013/0207575 A1 | 8/2013 | Bax et al. |
| 2014/0022061 A1 | 1/2014 | Apte et al. |
| 2014/0022798 A1 | 1/2014 | Yang |
| 2014/0022917 A1 | 1/2014 | Apte et al. |
| 2014/0022939 A1 | 1/2014 | Apte et al. |
| 2014/0022941 A1 | 1/2014 | Apte et al. |
| 2014/0023060 A1 | 1/2014 | Apte et al. |
| 2014/0033034 A1 | 1/2014 | Patel |
| 2014/0065588 A1 | 3/2014 | Jacobson et al. |
| 2014/0090197 A1 | 4/2014 | Bernhard et al. |
| 2014/0091001 A1 | 4/2014 | Chan et al. |
| 2014/0096331 A1 | 4/2014 | Farrell et al. |
| 2014/0246049 A1 | 9/2014 | Ikkink et al. |
| 2014/0250612 A1 | 9/2014 | Curry et al. |
| 2014/0310900 A1 | 10/2014 | Curry et al. |
| 2014/0324226 A1 | 10/2014 | Cook et al. |
| 2015/0044629 A1 | 2/2015 | Wang et al. |
| 2015/0088538 A1 | 3/2015 | Dykes et al. |
| 2015/0113747 A1 | 4/2015 | May et al. |
| 2015/0134369 A1 | 5/2015 | Sakata et al. |
| 2015/0141774 A1 | 5/2015 | Ogawa et al. |
| 2015/0157122 A1 | 6/2015 | Prescott |
| 2015/0202030 A1 | 7/2015 | Miller |
| 2015/0205279 A1 | 7/2015 | Simeth |
| 2015/0230593 A1 | 8/2015 | Doll et al. |
| 2015/0230898 A1 | 8/2015 | Miller |
| 2015/0230899 A1 | 8/2015 | Vetter et al. |
| 2015/0244773 A1 | 8/2015 | Wang et al. |
| 2015/0297085 A1 | 10/2015 | Simons et al. |
| 2015/0297089 A1 | 10/2015 | Deane et al. |
| 2015/0305626 A1 | 10/2015 | Deane et al. |
| 2015/0305670 A1 | 10/2015 | Spruit et al. |
| 2015/0313353 A1 | 11/2015 | Schmallmrst et al. |
| 2015/0320531 A1 | 11/2015 | Van Gool et al. |
| 2015/0330966 A1 | 11/2015 | Drake et al. |
| 2015/0351883 A1 | 12/2015 | Hwang et al. |
| 2015/0381096 A1 | 12/2015 | Klemm et al. |
| 2016/0015492 A1 | 1/2016 | Skaanland et al. |
| 2016/0022024 A1 | 1/2016 | Vetter et al. |
| 2016/0022393 A1 | 1/2016 | Yoshida et al. |
| 2016/0022398 A1 | 1/2016 | Vetter et al. |
| 2016/0143718 A1 | 5/2016 | Serval et al. |
| 2016/0235357 A1 | 8/2016 | Ohmer et al. |
| 2016/0242652 A1 | 8/2016 | Van Putten et al. |
| 2016/0270666 A1 | 9/2016 | Vermeulen |
| 2016/0296163 A1 | 10/2016 | Chaudhry et al. |
| 2016/0310248 A1 | 10/2016 | Meerbeek et al. |
| 2016/0317267 A1 | 11/2016 | Meerbeek et al. |
| 2016/0338635 A1 | 11/2016 | Johnson et al. |
| 2016/0343270 A1 | 11/2016 | Zheng et al. |
| 2019/0008270 A1* | 1/2019 | Hardeman ............ A46B 15/004 |

FOREIGN PATENT DOCUMENTS

| | | |
|---|---|---|
| CN | 204393685 U | 6/2015 |
| DE | 10224043 A1 | 12/2003 |
| DE | 10255722 A1 | 6/2004 |
| IN | 234961 B | 1/2007 |
| IN | 200601965 P1 | 8/2007 |
| IN | 200804686 P1 | 8/2008 |
| IN | 201204976 P4 | 10/2013 |
| IN | 201306137 P1 | 12/2014 |
| JP | 2001327331 A | 11/2001 |
| JP | 2002181812 A | 6/2002 |
| JP | 2003093416 A | 4/2003 |
| JP | 2006235809 A | 9/2006 |
| JP | 2010172384 A | 8/2010 |

(56) References Cited

FOREIGN PATENT DOCUMENTS

| | | |
|---|---|---|
| JP | 04543663 B2 | 9/2010 |
| JP | 2012086022 A | 5/2012 |
| JP | 2014023796 A | 2/2014 |
| KR | 20070103055 A | 10/2007 |
| RU | 2388430 C2 | 4/2009 |
| WO | WO 99/47020 A1 | 9/1999 |
| WO | WO 2008/058817 A1 | 5/2008 |
| WO | WO 2008/060482 A3 | 5/2008 |
| WO | WO 2008/147360 A1 | 12/2008 |
| WO | WO 2009/001295 A1 | 12/2008 |
| WO | WO 2010/134049 A1 | 11/2010 |
| WO | WO 2010/134051 A1 | 11/2010 |
| WO | WO 2012/042493 A1 | 4/2012 |
| WO | WO 2013/084403 A1 | 6/2013 |
| WO | WO 2014/016718 A1 | 1/2014 |
| WO | WO 2014/097022 A1 | 6/2014 |
| WO | WO 2014/097135 A1 | 6/2014 |
| WO | WO 2014/097240 A3 | 6/2014 |
| WO | WO 2015/003939 A1 | 1/2015 |
| WO | WO 2015/092125 A1 | 6/2015 |
| WO | WO 2015/092626 A1 | 6/2015 |
| WO | WO 2015/140340 A1 | 9/2015 |
| WO | WO 2015/177661 A1 | 9/2015 |
| WO | WO 2016/016323 A1 | 2/2016 |
| WO | WO 2016/020780 A1 | 2/2016 |
| WO | WO 2016/020803 A1 | 2/2016 |
| WO | WO 2016/046701 A1 | 3/2016 |
| WO | WO 2016/047793 A1 | 3/2016 |

* cited by examiner

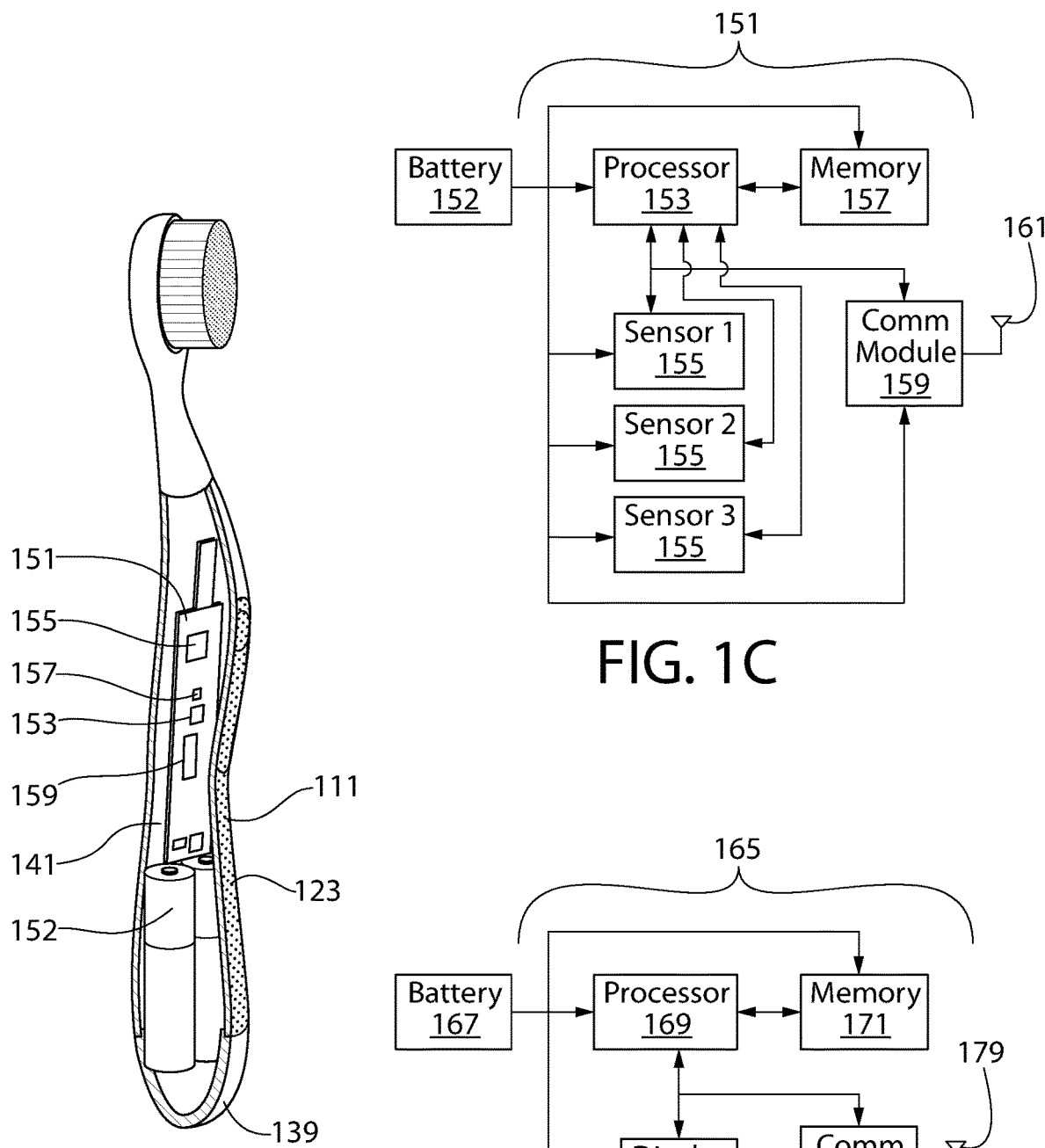
FIG. 1B
FIG. 1C
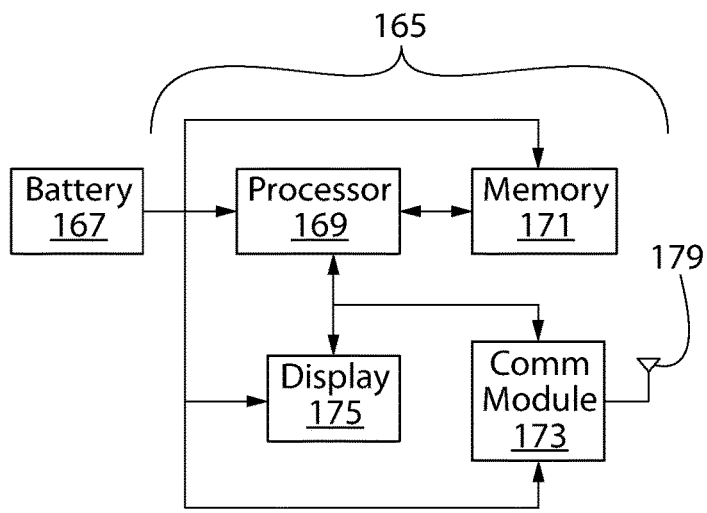
FIG. 1D

ORAL CARE SYSTEM AND METHOD

BACKGROUND

In attempting to improve oral care routines, it is typical to focus on the oral care routine employed by an individual and how that oral care routine differs from an accepted standard. The individual is then guided on how to change their oral care routine to better conform with the accepted standard. By conforming to the standard, it is expected that the overall effectiveness of the individual's oral care routine will improve, thereby improving the oral health of the individual. Having everyone conform to an accepted standard is an ideal, and perhaps not one that everyone is capable of achieving. For those who cannot or do not conform to the accepted standard for an oral care routine, for whatever the reason, it is desirable to provide a system and method that can still aid them in maintaining an effective oral care routine.

BRIEF SUMMARY

Exemplary embodiments according to the present disclosure are directed to oral care systems and methods which adapt to a user's brushing routine, taking into account the user's brushing habits, in order to improve the overall efficacy of the user's brushing routine. The oral care system includes an oral care device and a programmable processor. In one embodiment, the oral care device generates data concerning a user's brushing habits and the programmable processor analyzes the generated data. The programmable processor determines a target brushing time based upon the generated data and may communicate the target brushing time to the user during the brushing routine. The target brushing time may be determined section-by-section for the user's denture, thereby accounting for the user's different brushing habits for different sections of their denture. In addition, the target brushing time may be adjusted in real time to account for changes in the user's brushing habits. The oral care method includes steps of generating data concerning a user's brushing habits and determining appropriate target brushing time based upon the generated data. The target brushing time may also be communicated to the user during the brushing routine.

In one aspect, the invention can be an oral care system including: an oral care device including: at least one teeth cleaning element; and at least one sensor configured to detect motion of the oral care device during a brushing routine of a user and to generate sensor data corresponding to the detected motion; and a programmable processor configured to: receive the sensor data generated by the at least one sensor; and determine a target brushing time based on the sensor data.

In another aspect, the invention may be an oral care system including: an oral care device including: at least one teeth cleaning element; at least one sensor configured to detect a brushing intensity during a brushing routine of a user and to generate sensor data corresponding to the detected brushing intensity; and a programmable processor configured to: receive the sensor data generated by the at least one sensor; and determine a target brushing time based on the sensor data.

In yet another aspect, the invention may be a method for oral care including: a) receiving sensor data from at least one sensor configured to detect motion of an oral care device during a brushing routine of a user, the sensor data corresponding to the detected motion; and b) determining a target brushing time based on the sensor data.

In still another aspect, the invention may be a method for oral care including: a) receiving sensor data from at least one sensor configured to detect brushing intensity during a brushing routine of a user, the sensor data corresponding to the detected brushing intensity; and b) determining a target brushing time based on the sensor data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 1B illustrates a partial sectional view of a toothbrush of the oral care system of FIG. 1A;

FIG. 1C schematically illustrates electronic components of the toothbrush of FIG. 1B;

FIG. 1D schematically illustrates electronic components of the a data processing unit shown in FIG. 1A;

DETAILED DESCRIPTION

Figure 1A:
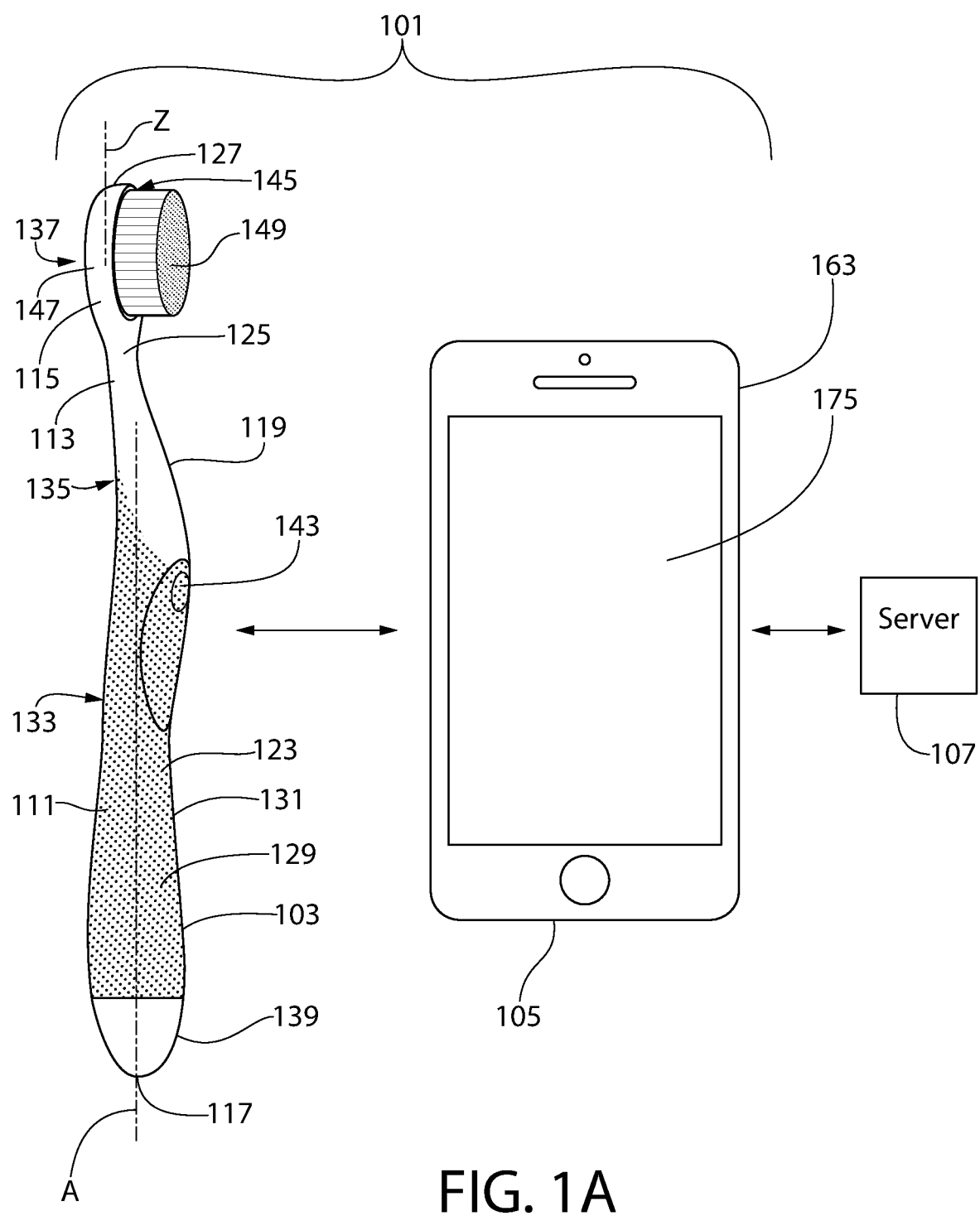
FIG. 1A illustrates an oral care system in accordance with a first embodiment of the present invention, the oral care system being in communication with a server.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The programmable processes described herein are not limited to any particular embodiment, and may be implemented in an operating system, application program, foreground or background processes, driver, or any combination thereof. The computer programmable processes may be executed on a single processor or on or across multiple processors.

Processors described herein may be any central processing unit (CPU), microprocessor, micro-controller, computational, or programmable device or circuit configured for executing computer program instructions (e.g. code). As used herein, the terms "processor" and "programmable processor" are used interchangeably. Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Turning in detail to the drawings, FIG. 1A illustrates an oral care system 101 in accordance with an embodiment of the present invention. The oral care system 101 includes a toothbrush 103 and a data processing unit 105. The data processing unit 105 may communicate with a server 107 for purposes of storing larger amounts of data or to provide server-side processing functionality. The presence of the server 107 and communication between the data processing unit 105 and the server 107, however, are not limiting of the present invention, unless specifically set forth in a claim.

The toothbrush 103 generally includes a handle 111, a neck 113, and a head 115. The neck 113 extends between the handle 111 and the head 115 and connects the head 115 to the handle 111. The handle 111 provides the user with a mechanism by which the toothbrush 103 can be readily gripped and manipulated during a brushing routine. The handle 111 may be formed of many different shapes, sizes and materials and may be formed by a variety of manufacturing methods that are well-known to those skilled in the art. The handle 111 extends from a proximal end 117 to a distal end 119 along a longitudinal axis A to form an elongated gripping portion 123 therebetween. The handle 111 transitions into the neck 113 at the distal end 119. While the neck 113 generally has a smaller transverse cross-sectional area than the handle 111, the invention is not so limited. Broadly speaking, the neck 113 forms a transition region between the handle 111 and the head 115, with the head 115 extending from an end of the neck 113 opposite the handle 111. While the head 115 is normally widened relative to the neck 113, in some embodiments the head 115 can simply be a continuous extension or narrowing of the neck 113 and/or handle 111. The head 115 extends from a proximal end 125 to a distal end 127 along a z-axis. In the exemplary embodiment, the z-axis is parallel to the longitudinal axis A. In certain embodiments, the z-axis may be placed at an angle to the longitudinal axis A.

In the exemplary embodiment, the handle 111 includes a suitable textured grip 129 made of a soft elastomeric material. The textured grip 129 may cover or form at least a portion of a front surface 131 and a rear surface 133 of the handle 111. The textured grip 129 may also extend to a rear surface 135 of the neck 113 and to a rear surface 137 of the head 115. The handle also includes a removable end cap 139 which enables access into a cavity 141 formed within the handle 111.

In embodiments in which a portion of the front surface 131 of the handle 111 is also covered by or formed from the material of the textured grip 129, the textured grip 129 may form part of or cover an electrical switch 143, which is operable between an open state and a closed state. The open and closed states of the electrical switch 143 serve to disconnect and connect, respectively, electric power to electronic circuitry (described below) within the cavity 141 of the handle 111. In certain embodiments, the electrical switch 143 may be a single button which alternates between the open and closed states. In alternative embodiments, the electrical switch 143 may include multiple buttons which serve to control the switch between the open and closed states. Of course, other types of switches may be used in conjunction with the toothbrush 103 for activating and deactivating the electronic circuitry within the cavity 141 of the handle 111, including without limitation slide switches, toggle switches, motion activated switches, photo-sensitive switches, sound-activated switches, electronic switches, and/or combinations thereof.

The electrical switch 143 may form one or more minor protrusions in the front surface 131 of the handle 111 for easy manipulation by a user. Specifically, when a user holds the toothbrush 103 in a normal fashion, the user's thumb will be positioned adjacent the electrical switch 143 to easily enable the user to actuate the electrical switch 143 between the open and closed states as desired. Of course, the invention is not so limited and the electrical switch 143 may be otherwise located on the handle 111, the neck 113 or elsewhere on the toothbrush 103.

The handle 111, the neck 113, and the head 115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 111, the neck 113, and the head 115 of the toothbrush 103 may be formed as a single unitary structure using a molding, milling, machining or other suitable process. Whether the handle 111, the neck 113, and the head 115 are of a unitary or multi-piece construction (including connection techniques) is not limiting of the present invention, unless specifically set forth in a claim. In some embodiments of the invention, the head 115 may be detachable (and replaceable) from the handle 111 and/or from the neck 113 using techniques known in the art.

The head 115 generally includes a front surface 145, the rear surface 137 and peripheral side surfaces 147 that extend between the front and rear surfaces 145, 137. The front surface 145 and the rear surface 137 of the head 115 can take on a wide variety of shapes and contours, none of which are limiting of the present invention. For example, the front and rear surfaces 145, 137 can be planar, contoured or combinations thereof.

The front surface 145 of the head 115 includes a collection of at least one teeth cleaning element, shown in the exemplary embodiment as a plurality of bristles 149, extending therefrom for cleaning teeth surfaces. As used herein, the term "teeth cleaning element" is used in a generic sense to refer to any structure that can be used to clean or polish the teeth through relative surface contact. In certain embodiments, the head 115 may include a single teeth cleaning element, and in other embodiments, the head 115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 149 of the present invention can be connected to the head 115 in any manner known in the art. For example, staples/anchors, in-mold tufting (IMT) or anchor free tufting (AFT) could be used to mount the bristles 149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Referring to FIG. 1B, the handle 111 is a housing for containing electronic circuitry 151 and a power source 152. The handle 111 is a hollow structure in which the cavity 141 is formed. More specifically, in the exemplified embodiment, the cavity 141 is formed in the elongated gripping portion 123 of the handle 111. In the exemplary embodiment, the power source 152 is shown as two batteries located within the cavity 141. Of course, the invention is not so limited and more or fewer than two batteries may be used, or alternatively, other types of power sources may be used. A removable end cap 139 forms the proximal end 117 of the handle 111 by engagement with the gripping portion 123 of the handle 111. In the exemplary embodiment, the end cap 139 may threadably engage the gripping portion 123 of the handle 111. In other embodiments, the end cap 139 may engage the gripping portion 123 of the handle 111 by snap engagement or by any other mechanical locking engagement. Removal of the end cap 139 exposes an opening 159 which forms a passageway into the cavity 141 through which the power source 152 can be inserted into and removed from the cavity 141. Access to the cavity may be formed in other ways in other embodiments. For example, the handle 111 may include a sliding panel which is removable to form an elongated opening along the longitudinal axis A of the handle 111 (e.g., the front surface, the rear surface and/or the side surfaces) to provide access to the cavity 141. Prior to use, a user may insert the power source 152 through the opening 159 and into the cavity 141 in the elongated gripping portion 123 of the handle 111, and the cavity 141 is enclosed by replacing the end cap 139.

The electronic circuitry 151 which may be included in an exemplary toothbrush 103 is shown in FIG. 1C. The electronic circuitry 151 includes a processor 153 communicably coupled to sensors 155, a memory 157, and a communication module 159. The number of sensors 155 included as part of the electronic circuitry 151 depends upon the types of physical properties to be detected and the functionality of each type of sensor employed. Physical properties may include position, motion, acceleration, frequency, and pressure against the surface of the teeth. Other types of physical properties associated with a brushing routine may also be detected, and those listed herein are not to be limiting of the invention unless otherwise indicated in the claims. In certain embodiments, only one sensor 155 may be included as part of the electronic circuitry 151, and in other embodiments, two or more sensors 155 may be included. By way of example, the at least one sensor 155 may be any one or more of the following: an accelerometer, a gyroscope, a magnetometer, a pressure sensor, among other types of sensors. While the functionality of certain types of sensors will be discussed in greater detail below, in general each sensor 155 included as part of the electronic circuitry 151 generates a sensor signal which includes sensor data that corresponds to the physical property detected by the sensor. For purposes of the present disclosure, the term "sensor data" is any type of information which may be extracted or derived from the sensor or sensor signal, regardless of the form of the extracted information. By way of example, sensor data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 153 and the memory 157 may be omitted from the electronic circuitry 151 of the toothbrush 103. In such embodiments, the sensors 155 may communicate sensor data directly to the communication module for transmission.

The memory 157 may be any appropriate type of memory or storage which enables the processor 153 to perform the desired programming, such as volatile and/or non-volatile random access memory, or any other type of storage. The particular type of storage used for the memory 157 is not to be limiting of the invention. The communication module 159 in the exemplary embodiment includes an antenna 161 to enable wireless communication. The communication module 159 may be configured and/or programmed to communicate using a wireless technology standard such as Wi-Fi, Bluetooth®, and the like, or it may communicate using any type of proprietary wireless transmission protocol. In certain embodiments, the communication module 159 may include a port to enable communications using wires and wired protocols, such as USB and the like. The particular mode of communication used by the communication module is not limiting of the invention unless specifically set forth in a claim.

Referring to both FIGS. 1A and 1D, the data processing unit 105 includes a housing 163 and electronic circuitry 165, with the housing enclosing and/or supporting the various components of the electronic circuitry 165. The electronic circuitry 165 is coupled to a power source 167, shown as a battery in the exemplary embodiment. Of course, the invention is not so limited, and other types of power sources may be used. The electronic circuitry 165 includes a processor 169 communicably coupled to a memory 171, a communication module 173, and a display 175. In certain embodiments, the electronic circuitry 165 may include other components, such as a speaker to provide audible feedback to the user, one or more buttons to receive input from the user, and one or more ports for making a wired connection between the electronic circuitry 165 and other circuitry external to the data processing unit 105. In certain other embodiments, the data processing unit 105 may be a smartphone, a tablet computer, a laptop computer, and the like, although the invention is not so limiting.

The memory 171 may be any appropriate type of memory or storage which enables the processor 169 to perform the desired programming, such as volatile and/or non-volatile random access memory. The particular type of storage used for the memory 171 is not to be limiting of the invention.

The display 175 may be any type of light emitting display, and as shown in the exemplary embodiment, the display 175 may be an LED panel. In certain other embodiments, the display 175 may be an LCD panel, an OLED panel, or any other type of display which is electronically controllable by the processor 169 to provide visual feedback to the user. In certain embodiments, the display 175 may be a touch sensitive display which accepts input from the user directly on the display surface. The type and configuration of the display 175 is not limiting of the invention unless specifically set forth in a claim.

The communication module 173 includes an antenna 179 to enable wireless transmission. The communication module 173 may be configured and/or programmed to communicate using a wireless technology standard such as Wi-Fi, Bluetooth®, and the like, or it may communicate using any type of proprietary wireless transmission protocol. The mode of communication for which the communication module 173 is configured is not limiting of the invention unless specifically set forth in a claim. In certain embodiments, the communication module 173 may include a port to enable communications using wires and wired protocols, such as USB and the like. For proper functioning of the exemplary embodiment, the communication module 159 of the toothbrush 103 and the communication module 173 of the data processing unit 105 communicate with each other, whether such communications are wireless or wired, using the same communication protocol.

The communication module 173 of the data processing unit 105 may also be configured and/or programmed to communicate with the server 107. The communication module 173 may communicate with the server 107 over any combination of public and/or private network, and the communications may be wired, wireless, or a combination of the two. In certain embodiments, the communication module 173 may communicate with the server 107 over the Internet using one or more types of communication protocols. In certain embodiments, the server 107 may be programmed with an application programming interface (API) which provides server-side functionality to the data processing unit 105.

In the exemplary embodiment, the processor 153 of the toothbrush 103 may be programmed with functionality to analyze the sensor data generated by the sensors 155. Similarly, the processor 169 of the data processing unit 105 may be programmed with functionality to analyze the sensor data generated by the sensors 155. In the ensuing description, the disclosed processes may be partially or wholly performed by one or both of the processor 153 of the toothbrush 103 and the processor 169 of the data processing unit 105 through programming provided to each respective processor 154, 169. In certain instances, where expressly indicated, the disclosed processes may be limited to programming on one of the processor 153 of the toothbrush 103 or the processor 169 of the data processing unit 105.

Figure 2:
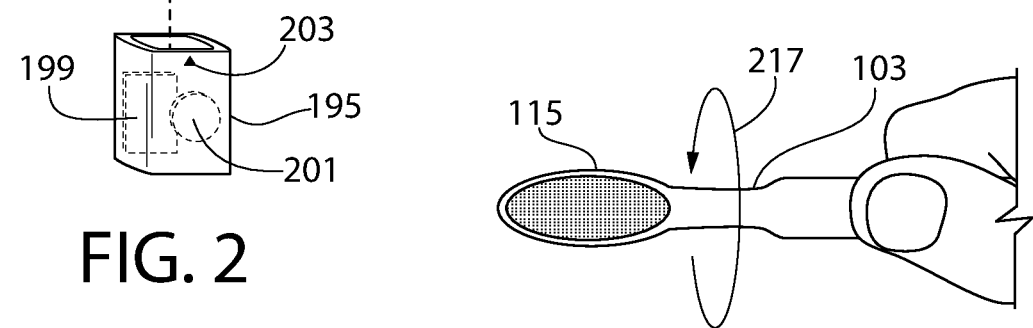
FIG. 2 illustrates a toothbrush and a dongle useable with an oral care system in accordance with a second embodiment of the present invention.

An alternative embodiment for an oral care device 181 which may be incorporated into the oral care system 101 is shown in FIG. 2. In this alternative embodiment, the oral care device 181 includes a toothbrush 183 which is generally formed by a handle 185, a neck 187, and a head 189. The front surface 191 of the head 189 includes at least one teeth cleaning element, shown as a plurality of bristles 193, extending therefrom for cleaning teeth surfaces. The oral care device 181 also includes a dongle 195 which may be removably coupled to the proximal end 197 of the handle 185. The dongle 195 is a housing for containing electronic circuitry 199 and an associated a power source 201, which may be the same as described above in connection with FIG. 1C. In the exemplary embodiment, the dongle 195 includes indicia 203 on one side thereof to indicate to the user the orientation of the dongle with respect to the bristles 193. Since the dongle 195 is removable from the handle 185, the analysis of sensor data and feedback to the user during a brushing routine, which are described in greater detail below, are facilitated by having the dongle 195 coupled to the handle 185 in a predetermined orientation.

Figure 3A:
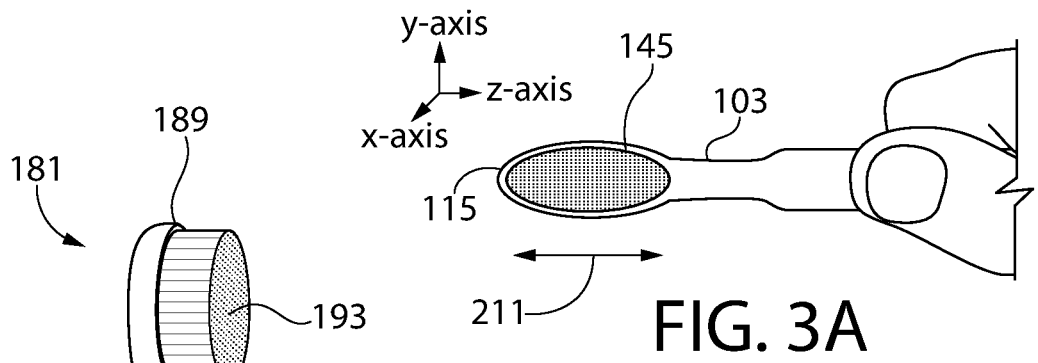
FIGS. 3A-D graphically illustrate four different types of motion for an oral care device.

FIGS. 3A-D illustrate four different types of brush stroke motions for the head 115 of the toothbrush 103 which may be detected during a brushing routine. In certain embodiments, each of these brush stroke motions may be detected through use of an accelerometer. In certain embodiments, brush stroke motions may be detected through use of a 3-axis accelerometer used in combination with a 3-axis gyroscope. The first brush stroke motion, illustrated by the arrow 211 in FIG. 3A, is a side-to-side linear brush stroke motion that is aligned parallel to the z-axis of the head 115 of the toothbrush 103. Using an accelerometer, this brush stroke motion may be detected as a linear acceleration along the z-axis. As indicated above, the z-axis in the exemplary embodiment is parallel to the longitudinal axis A of the handle (see FIG. 1A). The y-axis, for purposes of this disclosure, is defined as being perpendicular to the z-axis and parallel with at least a portion of the front surface 145 of the head 115. The x-axis, for purposes of this disclosure, is defined as being orthogonal to the plane formed by the y- and z-axes. Generally speaking, the at least one teeth cleaning element may extend from the front surface 145 of the head 115 substantially in the direction the x-axis, although the at least one teeth cleaning element need not be parallel to the x-axis. Of course, any coordinate system may be used to define the brush stroke motions of the head 115 of the toothbrush 103 while still staying within the spirit and scope of the invention.

Figure 3B:
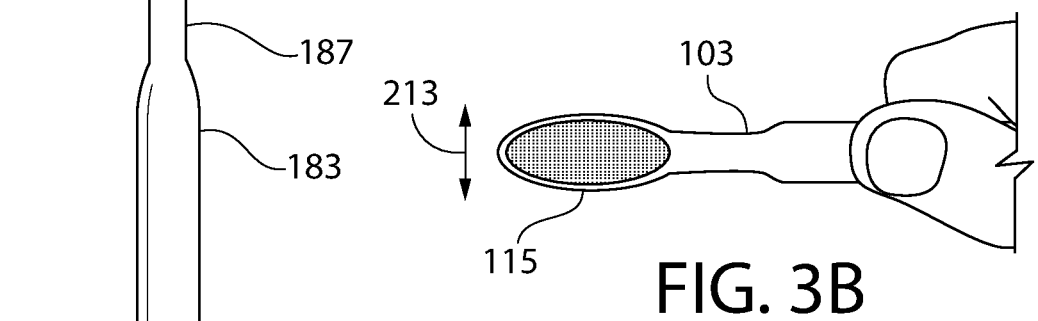
Figure 3C:
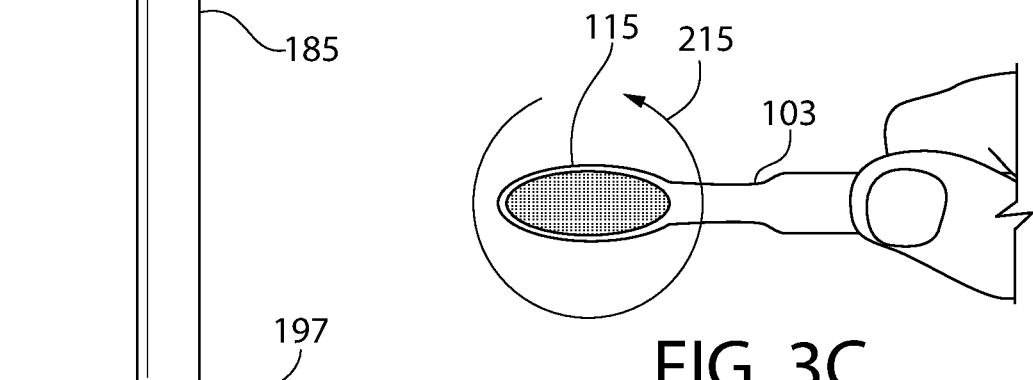
Figure 3D:
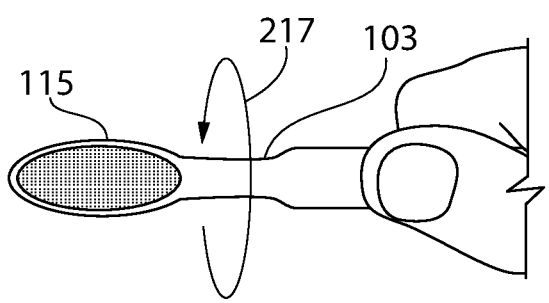

The second brush stroke motion, illustrated by the arrow 213 in FIG. 3B, is an up and down linear brush stroke motion that is aligned parallel to the y-axis of the head 115 of the toothbrush 103. Using an accelerometer, this brush stroke motion may be detected as a linear acceleration along the y-axis. The third brush stroke motion, which is illustrated by the arrow 215 in FIG. 3C, is a quasi-circular brush stroke motion that moves within a plane parallel to both y-axis and the z-axis. Using an accelerometer, this brush stroke motion is detected as a linear acceleration along the z-axis simultaneous with a linear acceleration along the y-axis with a phase shift between the y and z motions. In certain embodiments, quasi-circular brush stroke motion may be defined as having linear accelerations along both the y- and z-axes which exceeds a predetermined acceleration threshold or which differ by less than a predetermined amount. By way of example, a quasi-circular brush stroke motion may be defined as any simultaneous linear acceleration over 1 m/s$^2$ along each of the y- and z-axes. By way of another example, a quasi-circular brush stroke motion may be defined as any simultaneous linear acceleration along both the y- and z-axes which differs by less than 0.5 m/s$^2$. By way of a third example, a quasi-circular brush stroke motion may be defined in terms of the eccentricity of the ellipse described by the brushing motion, where an eccentricity of 0 corresponds to a perfect circle. In all cases, a linear brush stroke motion along either axis which falls outside of the predefined bounds of quasi-circular brush stroke motion may be identified as linear acceleration along the respective y- or z-axis. The fourth brush stroke motion, which is illustrated by the arrow 217 in FIG. 3D, is a flicking brush stroke motion which is rotation about the z-axis. This brush stroke motion may be detected using a gyroscope as a rotational acceleration about the z-axis.

Figure 4:
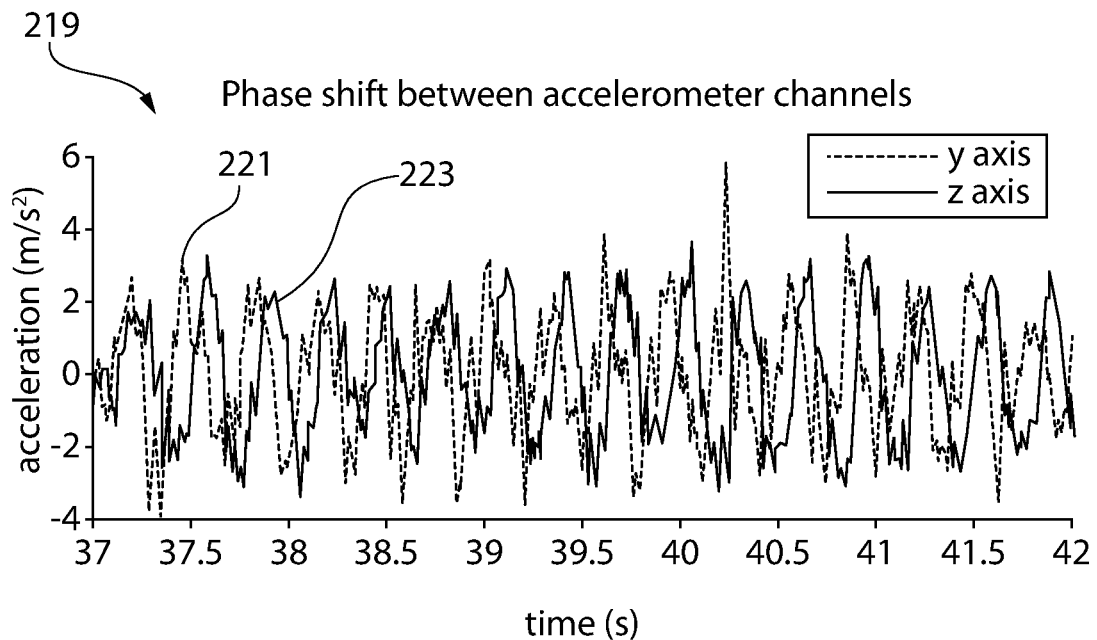
FIG. 4 is a graph illustrating a comparison between y-axis acceleration and z-axis acceleration versus time for an oral care device.
Figure 5:
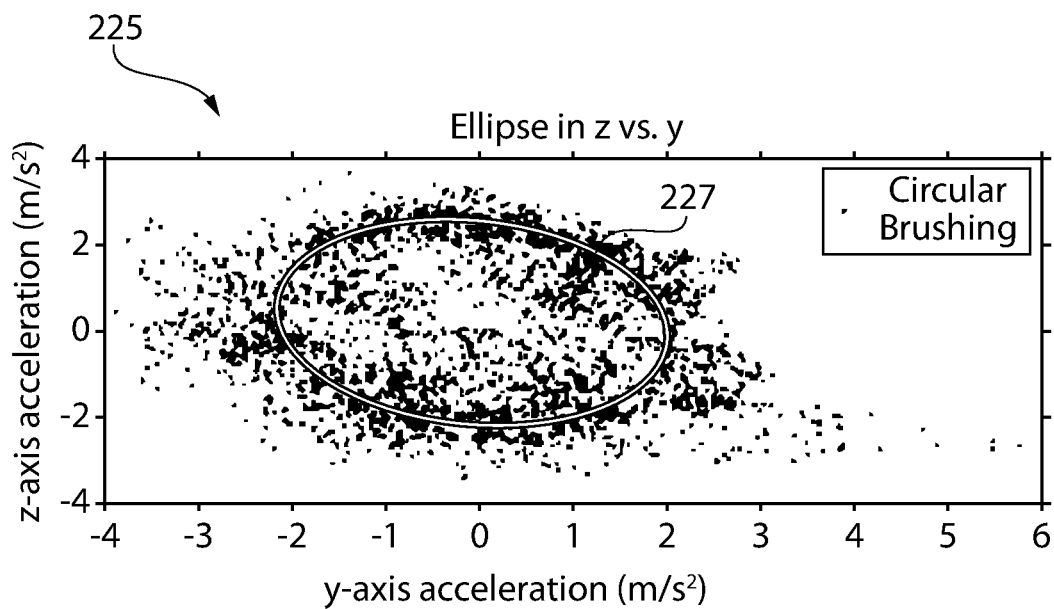
FIG. 5 is a graph illustrating z-axis acceleration versus y-axis acceleration for an oral care device.
Figure 6:
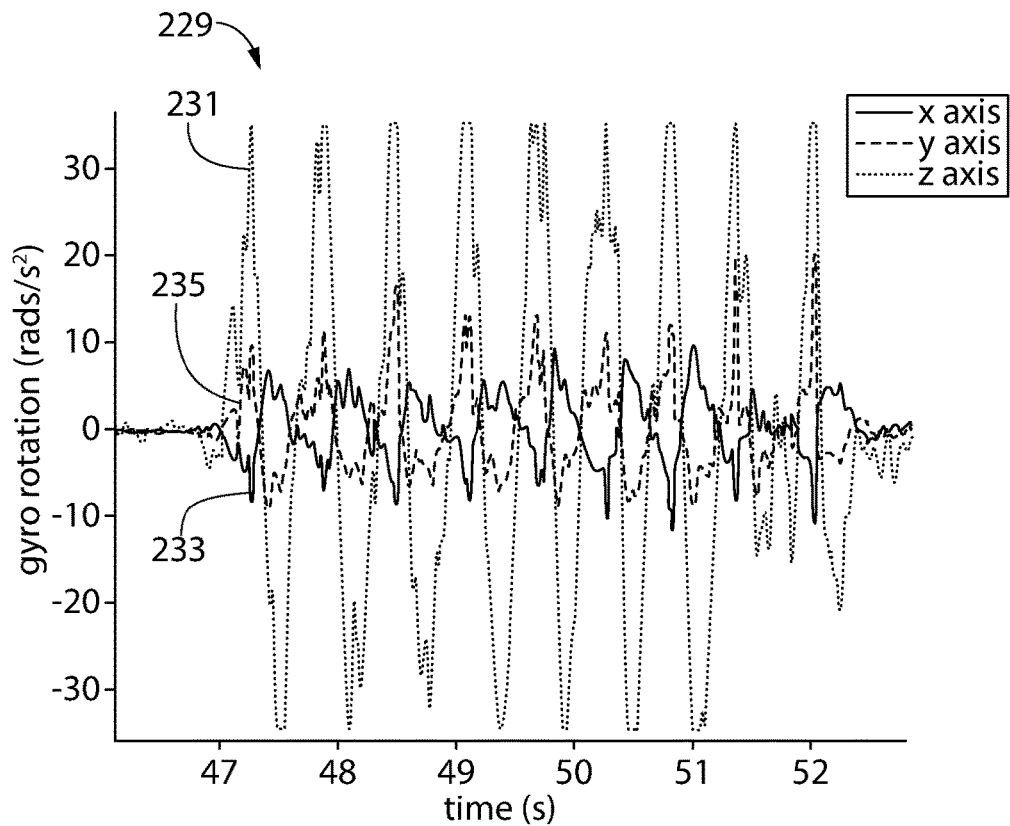
FIG. 6 is a graph illustrating rotational accelerations about three axes for an oral care device.

FIGS. 4-6 illustrate examples of sensor signals from which sensor data may be extracted and used to identify certain different types of brush stroke motion. FIG. 4 illustrates a graph 219 showing a sensor signal from an accelerometer as a combination of a y-axis acceleration signal 221 and a z-axis acceleration signal 223 over time. As can be seen from the overlaid y- and z-axis acceleration signals, the two acceleration signals exhibit a relative phase shift as compared to one another, and this relative phase shift may form sensor data used to identify brush stroke motion. Each acceleration signal indicates a linear brush stroke motion along the respective y- and z-axes. The amount of the phase shift between two respective acceleration signals may be used to determine whether a particular brush stroke motion is interpreted to be a quasi-circular brush stroke motion. Although whether a particular phase shift present in a brush stroke motion is interpreted as quasi-circular motion may also depend upon any established thresholds for the amount of phase shift. For example, a perfectly circular brushing motion exhibits a 90° phase shift between the two acceleration signals. In certain embodiments, it may be desirable or convenient to define a quasi-circular brushing motion as 90°±φ, where φ represents the predetermined threshold. In such embodiments, φ may be 1°-45°, and in still other embodiments, φ may be greater than 45°. In addition to phase, in certain embodiments, the amplitudes of the two acceleration signals may be used as a factor when determining whether a particular brush stroke is interpreted to have a quasi-circular brush stroke motion. For example, if the differences between amplitudes of the two acceleration signals is greater than a predetermined threshold value, then it may be desirable to determine that the underlying brush stroke motion does not qualify as a quasi-circular brush stroke motion, whereas acceleration signals which have differences between amplitudes less than the predetermined threshold are determined to represent a quasi-circular brush stroke motion. Alternatively, or in addition, in certain other embodiments, if one or both of the acceleration signals falls below a predetermined threshold, then it may be desirable to determine that the underlying brush stroke motion does not qualify as a quasi-circular brush stroke motion, whereas acceleration signals which extend above the predetermined threshold are determined to represent a quasi-circular brush stroke motion.

FIG. 5 illustrates a graph 225 which shows a plot of a y-axis acceleration signal against a z-axis acceleration signal. This graph 225 is an example of how the acceleration signals along the y- and z-axes may be interpreted as sensor data showing a quasi-circular brush stroke motion even though the actual motion is in fact not perfectly circular. The roughly elliptical brush stroke motion 227 in the graph 225 may be interpreted as a quasi-circular brush stroke motion because the overall phase shift between the two acceleration signals is greater than a predetermined threshold. As indicated above, other factors could be applied to the data shown in the graph 225 to determine which data should be included or excluded from the determination of whether a particular brush stroke motion qualifies as a quasi-circular brush stroke motion.

FIG. 6 illustrates a graph 229 showing a sensor signal from a gyroscope as a combination of acceleration signals generated from rotation about x-, y- and z-axes. This graph 229 shows an acceleration signal 231 resulting from rotation about the z-axis that is greater than the acceleration signals 233, 235 resulting from rotation about the x- and y-axes. The z-axis acceleration signal 231 may form sensor data used to identify a flicking brush stroke motion. While all of the x-, y-, and z-axis acceleration signals 231, 233, 235 are indicative of rotation about the respective axis, the acceleration signal 231 resulting from rotation about the z-axis is indicative of a flicking motion.

Figure 7:
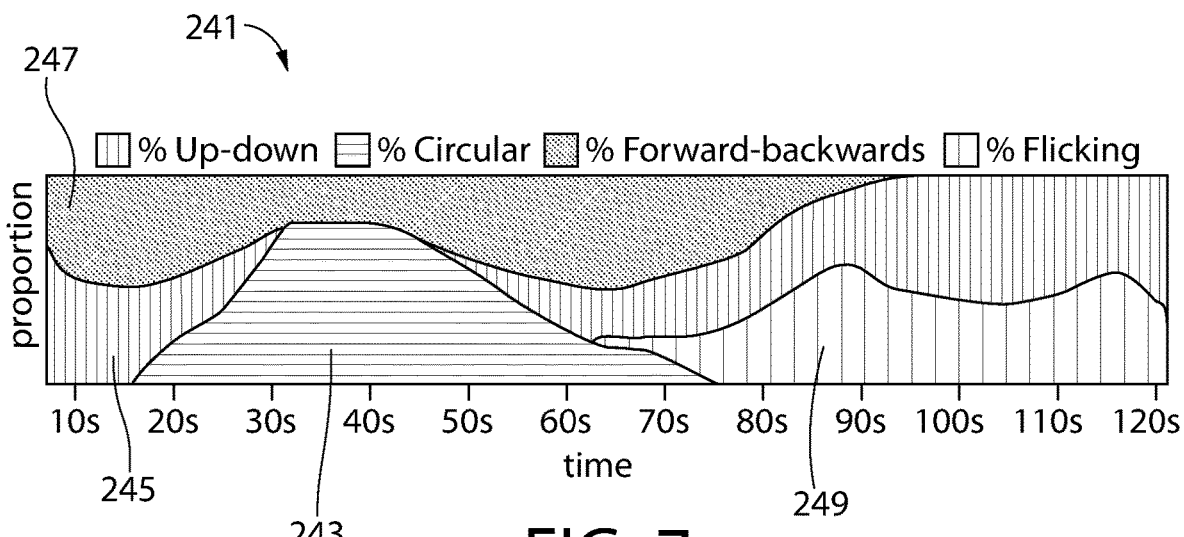
FIG. 7 is a chart showing a brushing profile with the proportion of each of the four brush stroke motions of FIGS. 3A-D over time.

A brushing profile graph 241 illustrating the proportion of different types of brush stroke motion over time during a brushing routine is shown in FIG. 7. An entire brushing routine is shown in the brushing profile graph 241, and in this instance the brushing routine lasted for 120 sec. In practice, a brushing routine may be longer or shorter than 120 sec, as each brushing routine has a time length, as explained in greater detail below, which is adjusted to account for the user's brushing habits. This brushing profile graph 241 shows how the brushing profile of a brushing routine may be viewed as a composite of different types of brush stroke motions. The different types of brush stroke motions shown are a quasi-circular brush stroke motion 243 (in the plane of the y- and z-axes), an up and down brush stroke motion 245 (in the direction of the y-axis), a forward and backward brush stroke motion 247 (in the direction of the z-axis), and a flicking brush stroke motion 249 (rotation about the z-axis). In the brushing profile graph 241, the up and down brush stroke motion 245 and the forward and backward brush stroke motion 247 are those parts of the acceleration signal during a brushing routine in which one and/or the other falls below the threshold for the brush stroke motion to be identified as a quasi-circular brush stroke motion. One technique that may be used to generate the brushing profile graph 241 is, after the brush stroke motions have been identified, integrate the portion of the sensor signal from which each particular brush stroke motion was identified to generate sensor data, apply a normalization factor to the sensor data, and then use the resulting normalized sensor data to determine the proportion of each brush stroke motion over time during the brushing routine. The normalization factors may vary based on the implementation and brushing philosophy. For example, according to the traditional brushing philosophy that circular brush strokes are best, quasi-circular brush strokes may be normalized to have a greater weight as a percentage of the brushing profile.

Figure 8:
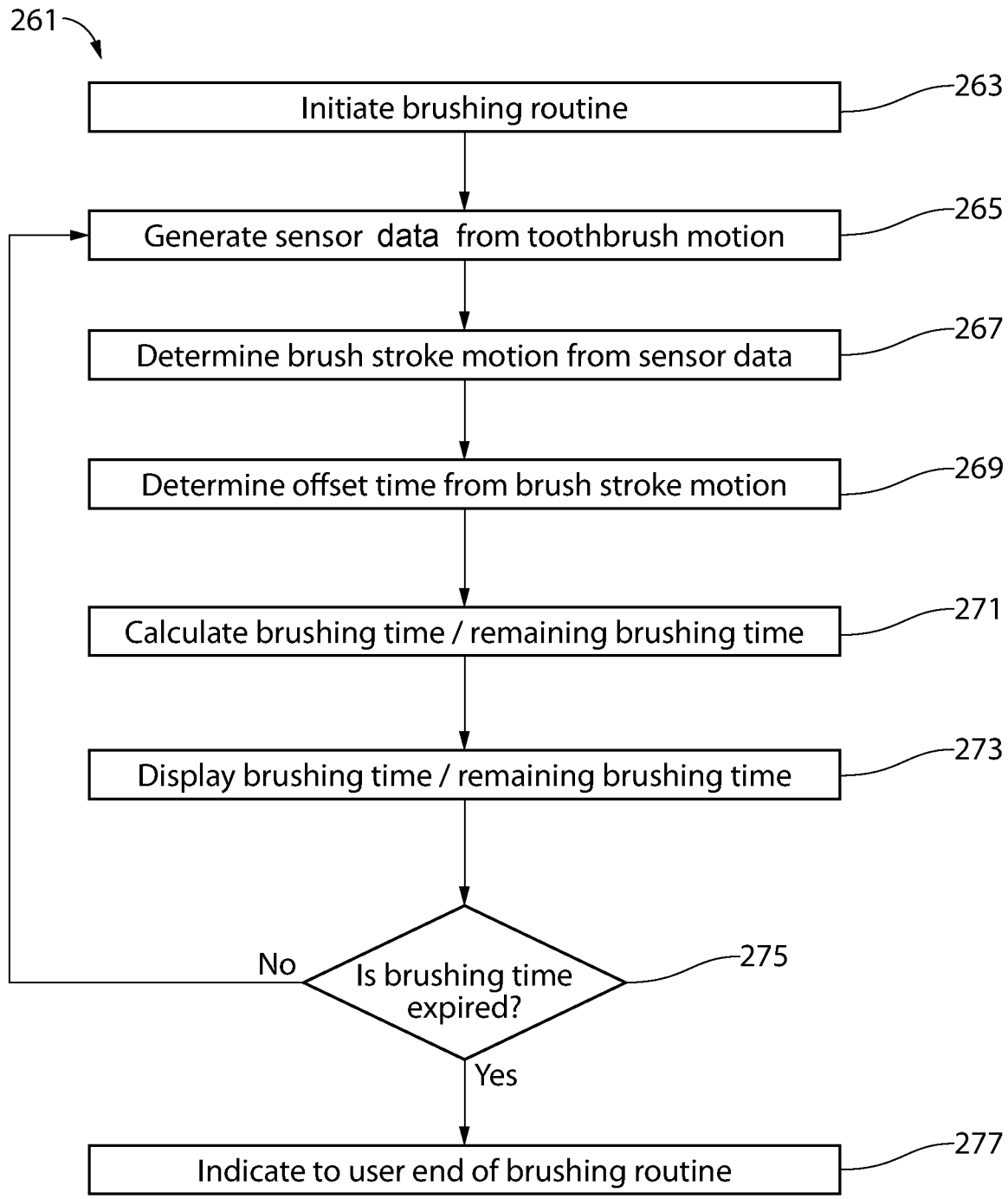
FIG. 8 is a flowchart showing a process for determining the target brushing time of a brushing routine, based on brush style motion, to achieve more efficient oral care using the oral care system of FIG. 1A.

A flowchart 261 showing an exemplary process for at least a portion of brushing routine is shown in FIG. 8. The process of this flowchart 261 serves to determine and adjust a target brushing time of a brushing routine based upon a determined brush stroke motion during the brushing routine, and the process may be implemented as programming for one or more processors. As should be appreciated, the target brushing time may be determined by processes different or varying from this exemplary process, such that the invention is not to be limited by the exemplary process. For convenience, as part of the description below, reference will also be made to the hardware components discussed above in FIGS. 1A-D. An initiation step 263 starts off the brushing routine, and this initiation step 263 may be achieved by the user pressing a button on one of the toothbrush 103 or on the data processing unit 105. Using the toothbrush 103, in certain embodiments, the initiation step 263 may be achieved by the user actuating the electrical switch 143. On the data processing unit 105, in certain embodiments, the initiation step may be achieved by first pressing the electrical switch 143 on the toothbrush 103 to power the electrical circuitry 151 of the toothbrush 103 and then pressing a button on the data processing unit 105, or if the data processing unit 105 includes a touch sensitive display, pressing a virtual button shown on touching the display 175.

As part of the initiation step 263, the user begins the brushing routine. In certain embodiments, the data processing unit 105 may direct the user to follow a predetermined sequence for the brushing routine, starting the brushing routine by brushing a predetermined section of the dentiture of the user and then continuing to other sections of the dentiture according to the predetermined sequence. In other embodiments, in which the toothbrush 103 has appropriate tracking sensors and the data processing unit 105 is able to determine which sections of the dentiture are being brushed, regardless of sequence, the data processing unit may direct the user to start the brushing routine by first brushing a predetermined section of the dentiture and then tracking which sections are being brushed and for how long each is brushed during the brushing routine. In still other embodiments, the user may provide input to the data processing unit to indicate the section of the dentiture that will be brushed during the first portion of the brushing routine and during each subsequent portion of the brushing routine.

Following the initiation step 263 is a sensor data generating step 265 which is performed by the electronic circuitry 151 of the toothbrush 103. During this step 265, the sensors 155 included in the toothbrush 103 sense the physical properties each is configured to detect and generate sensor data accordingly as the brushing routine begins and continues. Next is the brush stroke motion determination step 267. In this step 267, the sensor data is analyzed to determine the type or types of brush stroke motion for the first and/or current portion of the brushing routine. In other words, the sensor data may be analyzed in real time. In the exemplary embodiment, the sensor data is analyzed at least for a quasi-circular brush stroke motion. In certain embodiments, the sensor data may be a composite of different motions and is analyzed for two or more of a y-axis brush stroke motion, a z-axis brush stroke motion, a quasi-circular brush stroke motion, and a flicking brush stroke motion. The sensor data may be analyzed by the processor 153 of the toothbrush 103, or the sensor data may be transmitted by the communication module 159 of the toothbrush 103 to the communication module 173 of the data processing unit 105 to be analyzed by the processor 169 of the data processing unit 105. In certain embodiments, the sensor data may be analyzed in part by both the processor 153 of the toothbrush 103 and the processor 169 of the data processing unit 105.

Once the sensor data has been analyzed to determine one or more brush stroke motions present in the motion of the toothbrush, an offset time determining step 269 is performed. In the exemplary embodiment, this step 269 is performed by the processor 169 of the data processing unit 105, although in other embodiments the offset time may be determined by the processor 153 of the toothbrush 103. In this step 269, the offset time is determined using the determined brush stroke motions based on at least the start of the first or current portion of the brushing routine. The offset time is a reflection of the effectiveness of the user's brushing routine during a particular portion of the brushing routine. In certain embodiments, the offset time may be a reflection of the effectiveness of the user's brushing routine during two or more portions of the brushing routine, or even during the entire brushing routine. Specifically, if a portion of the brushing routine is determined to be less effective than an established standard, then the offset time is a positive number that may be used to increase the overall time length of the brushing routine. Generally, since the established standard calls for entirely circular brush strokes during a brushing routine, the offset time determined exclusively in terms of brush stroke motion will only be a positive number. However, as is discussed below, the offset time may be a negative number when brushing aggressiveness is taken into consideration.

The offset time may be determined by calculation, based on the percentages of different types of brush stroke motions that make up the determined brush stroke motion. Alternatively, the offset time may be determined using a lookup table, which may be a multi-dimensional matrix, each dimension representing one of the types of brush stroke motions, and each dimension divided into a plurality of values or value ranges. For example, in an embodiment in which the sensor data is analyzed for four different types of brush stroke motion, the lookup table is a four dimensional matrix. In such an embodiment, the matrix is based on calculations performed in advance, and comparison of the types of determined brush stroke motion with the matrix may yield the offset time faster than real-time calculations.

Following the offset time determining step 269 is a target brushing time calculation step 271. In this step 271, the target brushing time or remaining brushing time for the brushing routine is calculated. In the exemplary embodiment, this step 271 is also performed by the processor 169 of the data processing unit 105, although in other embodiments the offset time may be determined by the processor 153 of the toothbrush 103. During the initial part of the brushing routine, the processor 169 calculates the target brushing time by retrieving an optimum time which is stored in the memory 171 and adding the determined offset time to the optimum time. For purposes of the process shown in this flowchart 261, the optimum time represents the established standard for brushing effectiveness. As should be apparent, the offset time may increase the target brushing time in excess of the optimum time when the offset time is determined exclusively in terms of brush stroke motion. Also, when the brush stroke motion is determined to be primarily a quasi-circular brush stroke motion, then the determined offset time is zero and the target brushing time may then be the same as the optimum time.

Following the initial part of the brushing routine, the processor 169 (or alternatively, the processor 153) calculates the target brushing time again in the same manner, by re-determining the offset time, and then adjusting the target brushing time accordingly. This adjustment may be accounted for by determining the ratio of the brushing time remaining to the most recently calculated target brushing time, and then applying that same ratio to a newly calculated target brushing time, based on adding the re-determined offset time to the optimum time, to determine a new value for the brushing time remaining.

After the target brushing time calculation step 271 is a displaying step 273. During this step 273, the processor 169 controls the display 175 to indicate to the user the target brushing time and/or the brushing time remaining. While displaying the target brushing time and/or brushing time remaining, a step 275 is performed in which the processor 169 determines if the target brushing time has expired. When the target brushing time has expired, the processor 169 proceeds to an indication step 277, in which the processor 169 controls the display 175 to inform the user that the brushing routine is at an end. When the target brushing time has not expired, the process returns to the sensor data generating step 265 to continue determining the effectiveness of the user's brushing routine.

In certain embodiments, the displaying step 273 may be replaced with a more generalized feedback step, in which one of the processor 153 of the toothbrush 103 or the processor 169 of the data processing unit 105 provides feedback to the user when the target brushing time and/or the brushing time remaining has expired. Such feedback may be provided to the user, for example, as audio feedback through a speaker or visual feed back by one or more LED indicators.

As should be apparent from the above description of FIG. 8, in certain embodiments, the sensor data analysis and feedback of the target brushing time to the user may be entirely performed by the processor 153 of the toothbrush 103. In certain other embodiments, the processes for the sensor data analysis and feedback may be performed partially by the processor 153 of the toothbrush 103 and partially by the processor 169 of the data processing unit 105. In still other embodiments, the processes for the sensor data analysis and feedback may be entirely performed by the processor 169 of the data processing unit 105.

In certain embodiments, the user may use the toothbrush 103 without being within communication range of the data processing unit 105 so that there is no active communication link between the toothbrush 103 and the data processing unit 105. In such embodiments, the toothbrush 103 may perform the brush stroke determining step 267 and store a brushing profile, of the type shown in FIG. 7, in the memory 157. The next time the toothbrush 103 is within communication range of the data processing unit 105 and a communication link is established, the processor 153 of the toothbrush 103 may transmit any brushing profiles stored in memory to the data processing unit 105.

In certain embodiments, the processor 153 of the toothbrush 103 and/or the processor 169 of the data processing unit 105 may be programmed to calculate a performance metric using the determined brush stroke motion. Such a performance metric may express the brushing profile for each portion of the brushing routine, or even for the entire brushing routine, as a number. In embodiments in which the processor 153 of the toothbrush 103 performs the brush stroke determining step 267, the amount of resulting data stored in the memory may be significantly reduced for purposes of storage and later transmission to the data processing unit 105. In still other embodiments, the processor 169 of the data processing unit 105 may be configured to transmit to the server 107 any performance metrics calculated for a brushing routine. This includes performance metrics calculated by the processor 153 of the toothbrush 103 and those calculated by the processor 169 of the data processing unit 105. Calculation of performance metrics may reduce the amount of data stored in the memory 171 of the data processing unit 105 and/or transmitted to the server 107 for storage.

In certain embodiments, brushing profiles and/or performance metrics which are stored in the memory 171 of the data processing unit 105 or on the server 107 may be used during future brushing routines to aid in determining the offset time for a brushing routine. In particular, brushing profiles and/or performance metrics may be used to determine the target brushing time for a brushing routine prior to any sensor data being generated in step 265. In such embodiments, the calculating brushing time step 271 is performed to adjust the target brushing time determined from the brushing profiles and/or performance metrics. Also, in embodiments in which brushing profiles and/or performance metrics are stored, the brushing profiles and/or performance metrics may be analyzed by machine learning processes, and the machine learning may be used to enhance future brushing routines. Such machine learning may be performed by any one or more processors of the oral care system 101, and/or it may also be performed by an associated server 107.

Figure 9:
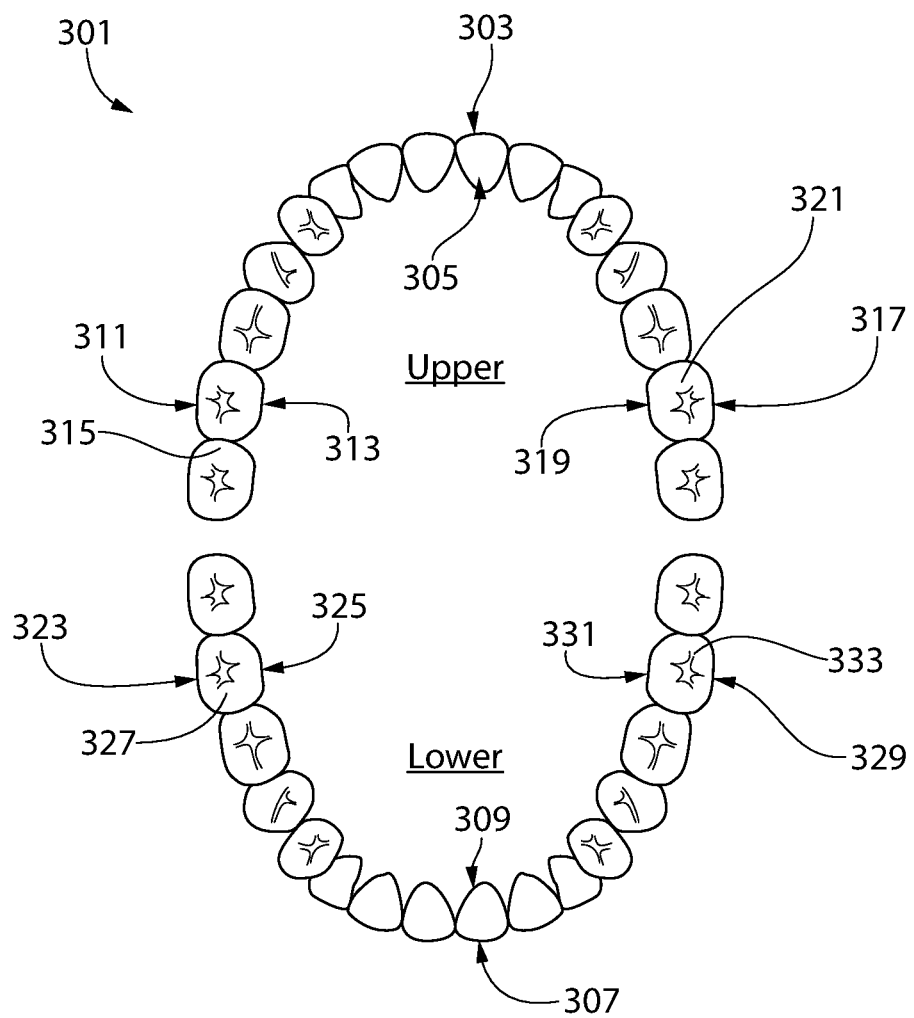
FIG. 9 illustrates different portions of the dentiture of a user for which the brushing routine may be independently analyzed and brushing times varied by the oral care system of FIG. 1A.

FIG. 9 illustrates the denture 301 of a user and the sixteen different sections thereof which may be brushed by different portions of the brushing routine. In certain embodiments, a one-to-one correspondence exists between each denture section and each portion of the brushing routine. By having such a one-to-one correspondence, in embodiments in which performance metrics are calculated, the efficiency of a user's brushing routine for the entire denture may be more efficiently stored in memory for later use or reference. In certain other embodiments, any one portion of the brushing routine may correspond to multiple denture sections. In still other embodiments, the entire brushing routine has a single portion corresponding to all sections of the denture. The sections of the denture shown in FIG. 9 are: upper mesial buccal section 303; upper mesial lingual section 305; lower mesial buccal section 307; lower mesial lingual section 309; upper right buccal section 311; upper right lingual section 313; upper right occlusal section 315; upper left buccal section 317; upper left lingual section 319; upper left occlusal section 321; lower right buccal section 323; lower right lingual section 325; lower right occlusal section 327; lower left buccal section 329; lower left lingual section 331; and lower left occlusal section 333.

Figure 10A:
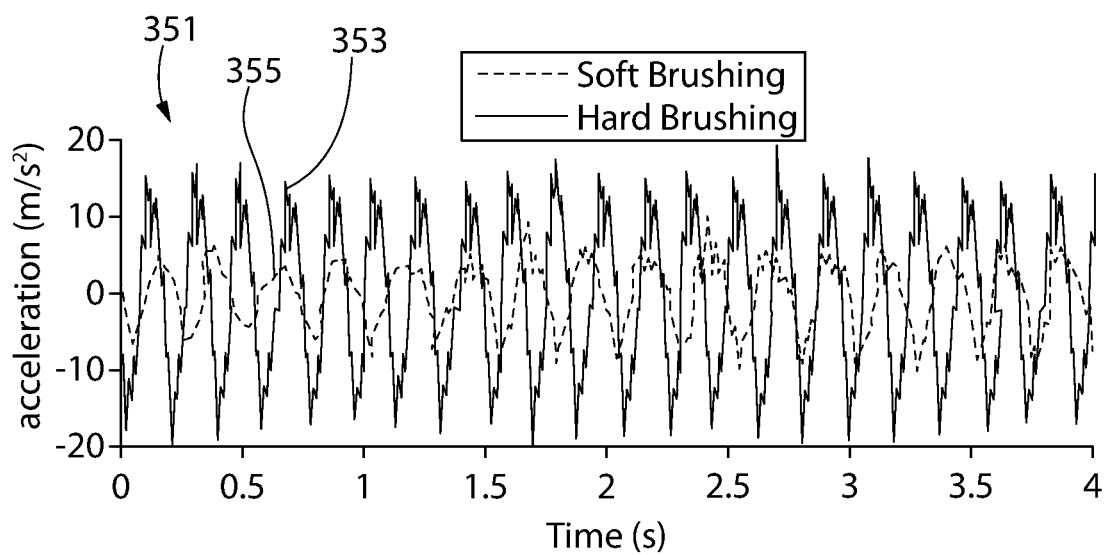
FIG. 10A is a first chart showing a comparison between two different stroke rates for an oral care device.

Another physical property which may be monitored during a brushing routine is brushing intensity, which is a measure of brushing aggressiveness during a brushing routine. Brushing aggressiveness during a brushing routine is characterized by over-brushing and/or under-brushing. Similar to how the target brushing time based on brush stroke motion is determined during a brushing routine, the target brushing time of a brushing routine based on brushing aggressiveness may also be determined. In certain embodiments, brushing aggressiveness may be used on its own to determine the target brushing time. In certain other embodiments, brushing aggressiveness may be combined with brush stroke motion to determine the target brushing time. FIG. 10A illustrates a graph 351 which shows a plot of two z-axis acceleration signals 353, 355 taken from two different brushing routines. These two acceleration signals 353, 255, show the difference in the stroke rates used for the respective brushing routines. The stroke rate is the frequency of linear motion along the z-axis of the oral care device. The first acceleration signal 353 is illustrative of over-brushing, while the second acceleration signal 355 is illustrative of under-brushing. In the process described below, compensation for any over- or under-brushing may be achieved by adding a negative or positive offset time, respectively, to an optimum brushing time. As can be seen in the graph 351, the first acceleration signal 353 exhibits a larger amplitude as compared to the second acceleration signal 355. The larger amplitude of the first acceleration signal 353 indicate that the user is moving the head 115 of the toothbrush 103 in quick motions along the z-axis. In comparison, the smaller amplitude of the second acceleration signal 355 indicate that the user is moving the head 115 of the toothbrush 103 in slower motions along the z-axis.

Figure 10B:
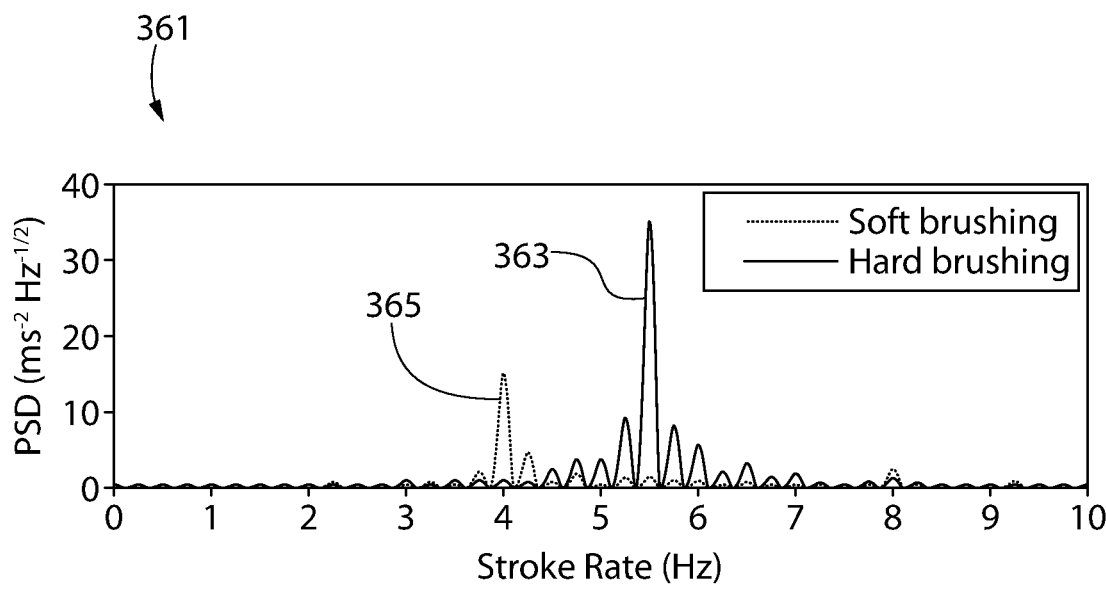
FIG. 10B is a second chart showing a comparison of power spectral density between two different stroke rates for an oral care device.

FIG. 10B illustrates the stroke intensity in a graph 361 which shows power spectral density versus stroke rate derived from two z-axis acceleration signals 363, 365. This graph 361 shows the number of discrete frequencies that are present in the each of the acceleration signals 363, 365. The first acceleration signal 363 is illustrative of over-brushing, while the second acceleration signal 365 is illustrative of under-brushing. As can be seen, the first acceleration signal 363 includes a dominant peak at a higher frequency as compared to the second acceleration signal 365. The higher frequency of the dominant peak in the first acceleration signal 363 is another indication that the user is moving the head 115 of the toothbrush 103 at a faster rate along the z-axis. In comparison, the lower frequency of the dominant peak of the second acceleration signal 355 indicate that the user is moving the head 115 of the toothbrush 103 at a slower rate along the z-axis.

Another indication of over- or under-brushing may be obtained by a force sensor placed in the toothbrush 103. The force sensor may be positioned within the handle 111 of the toothbrush 103 so that as teeth are brushed, the force sensor generates sensor data which is indicative of the amount of pressure placed on the teeth by the bristles 149.

Figure 11:
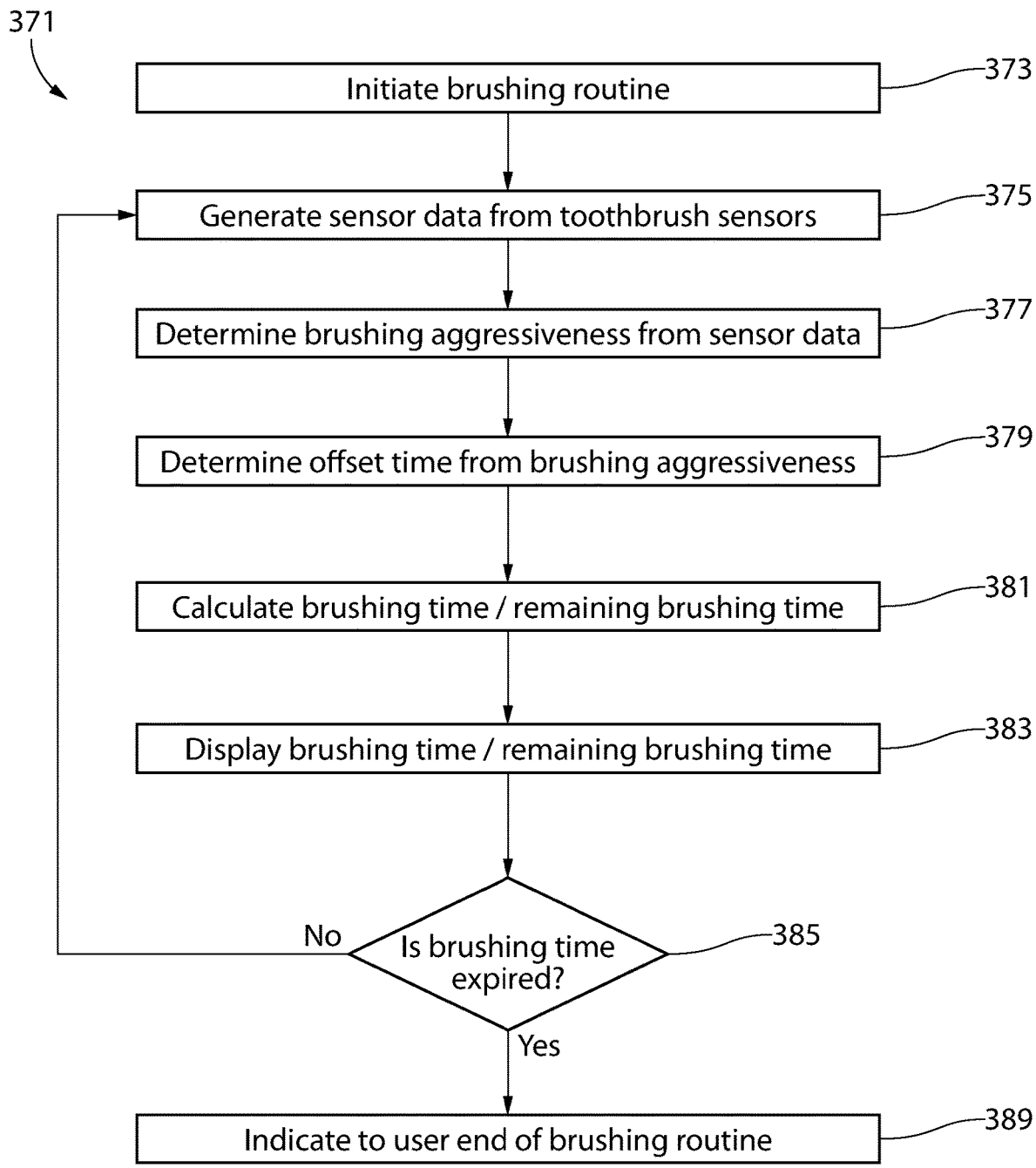
FIG. 11 is a flowchart showing a process for determining the target brushing time of a brushing routine, based on brushing aggressiveness, to achieve better oral care using the oral care system of FIG. 1A.

A flowchart 371 showing an exemplary process for at least a portion of brushing routine is shown in FIG. 11. The process of this flowchart 371 serves to determine and/or adjust a target brushing time of a brushing routine based upon a determined brushing aggressiveness during the brushing routine. As should be appreciated, the target brushing time may be determined by processes different or varying from this exemplary process, such that the invention is not to be limited to the exemplary process. An initiation step 373 starts off the brushing routine. This initiation step 373 may be achieved by the user pressing a button on one of the toothbrush 103 or on the data processing unit 105. Using the toothbrush 103, in certain embodiments, the initiation step 373 may be achieved by the user actuating the electrical switch 143. On the data processing unit 105, in certain embodiments, the initiation step 373 may be achieved by first pressing the electrical switch 143 on the toothbrush 103 to power the electrical circuitry 151 of the toothbrush 103 and then pressing a button on the data processing unit 105, or if the data processing unit 105 includes a touch sensitive display, touching a virtual button shown on the display 175.

As part of the initiation step 373, the user begins the brushing routine. In certain embodiments, the data processing unit 105 may direct the user to follow a predetermined sequence for the brushing routine, starting the brushing routine by brushing a predetermined section of the denture of the user and then continuing to other sections of the denture according to the predetermined sequence. In other embodiments, in which the toothbrush 103 has appropriate tracking sensors and the data processing unit 105 is able to determine which sections of the denture are being brushed, regardless of sequence, the data processing unit 105 may direct the user to start the brushing routine by first brushing a predetermined section of the denture and then tracking which sections are brushed and for how long each is brushed during the brushing routine. In still other embodiments, the user may provide input to the data processing unit to indicate the section of the denture that will be brushed during the first portion of the brushing routine and during each subsequent portion of the brushing routine.

Following the initiation step 373 is a sensor data generating step 375 which is performed by the electronic circuitry 151 of the toothbrush 103. During this step 375, the sensors 155 included in the toothbrush sense the physical properties each is configured to monitor and generate signals accordingly as the brushing routine begins and continues. For determining brushing aggressiveness, the sensors may include at least one of an accelerometer and a force sensor. Next is the brushing aggressiveness determination step 377. In this step 377, the sensor data is analyzed to determine the brushing aggressiveness for the first and/or current portion of the brushing routine. In other words, the sensor data may be analyzed in real time. As indicated above, brushing aggressiveness may be determined by analyzing one or more of an acceleration signal, a power spectral density of an acceleration signal, and a force signal. The sensor data may be analyzed by the processor 153 of the toothbrush 103, or the sensor data may be transmitted by the communication module 159 of the toothbrush 103 to the communication module 173 of the data processing unit 105 to be analyzed by the processor 169 of the data processing unit 105. In certain embodiments, the sensor data may be analyzed in part by both the processor 153 of the toothbrush 103 and the processor 169 of the data processing unit 105.

Once the sensor data has been analyzed to determine the brushing aggressiveness, an offset time determining step 379 is performed. In the exemplary embodiment, this step 379 is performed by the processor 169 of the data processing unit 105. In this step 379, the offset time is determined using the determined brushing aggressiveness based on at least the start of the first portion of the brushing routine. The offset time is a reflection of the over- or under-brushing of the user's brushing routine during a particular portion of the brushing routine. In certain embodiments, the offset time may be a reflection of the over- or under-brushing of the user's brushing routine during two or more portions of the brushing routine, or even during the entire brushing routine. Specifically, if a portion of the brushing routine is determined to include under-brushing as compared to an established standard, then the offset time may be a positive number that may be used to increase the time of the brushing routine. Alternatively, if a portion of the brushing routine is determined to include over-brushing as compared to the established standard, then the offset time is a negative number that may be used to decrease the time of the brushing routine.

The offset time may be determined by calculation, based on the amount of over- or under-brushing, or alternatively, the offset time may be determined through use of a lookup table. In embodiments which use a lookup table, all potential offset times included in the lookup table are calculated in advance.

Following the offset time determining step 379 is a target brushing time calculation step 381. In this step 381, the target brushing time or remaining brushing time for the brushing routine is calculated. In the exemplary embodiment, this step 381 is also performed by the processor 169 of the data processing unit 105. During the initial part of the brushing routine, the processor 169 calculates the target brushing time by retrieving an optimum time which is stored in the memory 171 and adding the determined offset time to the optimum time. For purposes of the process shown in this flowchart 371, the optimum time represents the established standard based on a generally neutral brushing aggressiveness.

Following the initial part of the brushing routine, the processor 169 calculates the target brushing time in the same manner, by re-determining the offset time, and then adjusting the target brushing time accordingly. This adjustment may be accounted for by determining the ratio of the brushing time remaining to the most recently calculated target brushing time, and then applying that same ratio to a newly calculated target brushing time, based on adding the re-determined offset time to the optimum time, to determine a new value for the brushing time remaining.

After the target brushing time calculation step 381 is a displaying step 383. During this step 383, the processor 169 controls the display 175 to indicate to the user the target brushing time and/or the brushing time remaining. During the displaying step 383 is a step 385 in which the processor 169 determines if the target brushing time has expired. When the target brushing time has expired, the processor 169 proceeds to an indication step 387, in which the processor 169 controls the display 175 to inform the user that the brushing routine is at an end. When the target brushing time has not expired, the process returns to the sensor data generating step 375 to continue determining the brushing aggressiveness of the user's brushing routine.

In certain embodiments, the displaying step 383 may be replaced with a more generalized feedback step, in which one of the processor 153 of the toothbrush 103 or the processor 169 of the data processing unit 105 provides feedback to the user when the target brushing time and/or the brushing time remaining has expired. Such feedback may be provided to the user, for example, as audio feedback through a speaker or visual feed back by one or more LED indicators.

As should be apparent from the above description of FIG. 11, in certain embodiments, the entirety of the sensor data analysis and feedback of the target brushing time to the user may be entirely performed by the processor 153 of the toothbrush 103. In certain other embodiments, the processes for the sensor data analysis and feedback may be performed partially by the processor 153 of the toothbrush 103 and partially by the processor 169 of the data processing unit 105. In still other embodiments, the processes for the sensor data analysis and feedback may be entirely performed by the processor 169 of the data processing unit 105.

In certain embodiments, the processor 153 of the toothbrush 103 and/or the processor 169 of the data processing unit 105 may be programmed to calculate a performance metric using the determined brushing aggressiveness. Such a performance metric may express the brushing aggressiveness for each portion of the brushing routine, or even for the entire brushing routine, as a number. In embodiments in which the processor 153 of the toothbrush 103 performs the brushing aggressiveness determining step 377, the amount of resulting data stored in the memory may be significantly reduced for purposes of storage and later transmission to the data processing unit 105. In still other embodiments, the processor 169 of the data processing unit 105 may be configured to transmit to the server 107 any performance metrics calculated for a brushing routine. This includes performance metrics calculated by the processor 153 of the toothbrush 103 and those calculated by the processor 169 of the data processing unit 105. Calculation of performance metrics may reduce the amount of data stored in the memory 171 of the data processing unit 105 and/or transmitted to the server 107 for storage.

In certain embodiments, brushing profiles and/or performance metrics which are stored in the memory 171 of the data processing unit 105 or on the server 107 may be used during future brushing routines to aid in determining the offset time for a brushing routine. In particular, brushing profiles and/or performance metrics may be used to determine the target brushing time for a brushing routine prior to any sensor data being generated in step 375. In such embodiments, the calculating the target brushing time step 381 is performed to adjust the target brushing time determined from the brushing profiles and/or performance metrics. Also, in embodiments in which brushing profiles and/or performance metrics are stored, the brushing profiles and/or performance metrics may be analyzed by machine learning processes, and the machine learning may be used to enhance future brushing routines. Such machine learning may be performed by any one or more processors of the oral care system 101, and/or it may also be performed by an associated server 107.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care system comprising:
    an oral care device comprising:
        at least one teeth cleaning element; and
        at least one sensor configured to detect a brushing intensity during a brushing routine of a user and to generate sensor data corresponding to the detected brushing intensity; and
    a programmable processor configured to:
        receive the sensor data generated by the at least one sensor; and
        determine a brush time remaining based on the sensor data;
    a first communication module operatively coupled to the at least one sensor and configured to transmit the sensor data;
    a data processing unit comprising:
        the programmable processor;
        a second communication module operatively coupled to the programmable processor and configured to receive the sensor data from the first communication module;
        a display operatively coupled to the programmable processor; and
    wherein the programmable processor is configured to analyze the sensor data and indicate to the user on the display the brush time remaining.

2. The oral care system according to claim 1, wherein the at least one sensor comprises at least one of an accelerometer and a force sensor.

3. The oral care system according to claim 1, further comprising a data processing unit, wherein:
    the programmable processor comprises a first processor and a second processor;
    the oral care device comprises the first processor; and
    the data processing unit comprises the second processor.

4. The oral care system according to claim 1, wherein the at least one teeth cleaning element comprises at least one bristle tuft.

5. The oral care system according to claim 1, wherein the programmable processor provides feedback to the user when the brush time remaining has expired.

6. The oral care system according to claim 5, wherein the feedback provided to the user by the programmable processor is audio feedback through a speaker or visual feedback by an LED indicator.

7. An oral care system comprising:
    an oral care device comprising:
        at least one teeth cleaning element;
        at least one sensor configured to detect a brushing intensity during a brushing routine of a user and to generate sensor data corresponding to the detected brushing intensity; and
        a first communication module operatively coupled to the at least one sensor and configured to transmit the sensor data;
    a programmable processor configured to:
        receive the sensor data generated by the at least one sensor; and
        determine a target brushing time based on the sensor data; and
    a data processing unit comprising:
        the programmable processor;
        a second communication module operatively coupled to the programmable processor and configured to receive the sensor data from the first communication module;
        a memory operatively coupled to the programmable processor, the memory comprising an optimum time for a first portion of the brushing routine;
        a display operatively coupled to the programmable processor; and
    wherein the programmable processor is configured to analyze the sensor data to determine a brushing aggressiveness used during the first portion of the brushing routine, determine an offset time using the determined brushing aggressiveness during a start of the first portion of the brushing routine, calculate the target brushing time for the first portion of the brushing routine as the optimum time plus the offset time, and indicate to the user on the display the target brushing time.

8. The oral care system according to claim 7, wherein after determining the offset time, the programmable processor is further configured to repeatedly:
    re-determine the offset time using the determined brushing aggressiveness during the first portion of the brushing routine; and
    adjust the target brushing time using the re-determined offset time.

9. The oral care system according to claim 7, wherein the programmable processor is further configured to calculate a performance metric using the determined brushing aggressiveness for the first portion of the brushing routine and to store the performance metric in the memory.

10. The oral care system according to claim 7, wherein the determined brushing aggressiveness comprises one or more of a stroke rate, a stroke intensity, and an applied pressure.

11. The oral care system according to claim 10, wherein the sensor data comprises acceleration data, and the stroke intensity comprises a power spectral distribution of the acceleration data.

12. The oral care system according to claim 7, wherein the first portion of the brushing routine comprises a brushing of a first section of a denbiture of the user, the brushing routine comprising at least the first portion and a second portion.

13. An oral care system comprising:
    an oral care device comprising:
        at least one teeth cleaning element;
        at least one sensor configured to detect a brushing intensity during a brushing routine of a user and to generate sensor data corresponding to the detected brushing intensity;

a data processing unit comprising a programmable processor configured to:
  receive the sensor data generated by the at least one sensor; and
  determine a target brushing time based on the sensor data;
wherein:
  the programmable processor comprises a first processor and a second processor;
  the oral care device comprises the first processor; and
  the data processing unit comprises the second processor;
the oral care device further comprising:
  a first memory operatively coupled to the first processor; and
  a first communication module operatively coupled to the at least one sensor and configured to transmit the sensor data; and
the data processing unit further comprising:
  a second communication module operatively coupled to the second processor and configured to receive the sensor data from the first communication module;
  a second memory operatively coupled to the second processor, the second memory comprising an optimum time for a first portion of the brushing routine;
  a display operatively coupled to the second processor;
  wherein at least one of the first processor and the second processor is configured to analyze the sensor data to determine a brushing aggressiveness used during the first portion of the brushing routine, and during the first portion of the brushing routine and while the second communication module receives the sensor data from the first communication module, determine an offset time using the determined brushing aggressiveness, calculate the target brushing time for the first portion of the brushing routine as the optimum time plus the offset time, and indicate to the user on the display the target brushing time.

14. The oral care system according to claim 13, wherein after determining the offset time, at least one of the first processor and the second processor is configured to repeatedly:
  re-determine the offset time using the determined brushing aggressiveness during the first portion of the brushing routine; and
  adjust the target brushing time using the re-determined offset time.

15. The oral care system according to claim 13, wherein:
at least one of the first processor and the second processor is configured to calculate a performance metric using the determined brushing aggressiveness for the first portion of the brushing routine; and
  the second processor is configured to store the calculated performance metric for the first portion of the brushing routine in the second memory.

16. The oral care system according to claim 13, wherein the determined brushing aggressiveness comprises one or more of a stroke rate, a stroke intensity, and an applied pressure.

17. The oral care system according to claim 16, wherein the sensor data comprises acceleration data, and the stroke intensity comprises a power spectral distribution of the acceleration data.

18. An oral care system comprising:
an oral care device comprising:
  at least one teeth cleaning element; and
  at least one sensor configured to detect a brushing intensity during a brushing routine of a user and to generate sensor data corresponding to the detected brushing intensity; and
a programmable processor configured to:
  receive the sensor data generated by the at least one sensor; and
  determine a brush time remaining based on the sensor data;
a first communication module operatively coupled to the at least one sensor and configured to transmit the sensor data;
a data processing unit comprising:
  the programmable processor;
  a second communication module operatively coupled to the programmable processor and configured to receive the sensor data from the first communication module;
  a memory operatively coupled to the programmable processor, the memory comprising an optimum time for the brushing routine; and
  wherein the programmable processor is configured to analyze the sensor data to determine a brushing aggressiveness used during the first portion of the brushing routine, determine an offset time using the determined brushing aggressiveness during a start of the first portion of the brushing routine, and calculate the brush time remaining for the first portion of the brushing routine as the optimum time plus the offset time; and
  wherein the programmable processor provides feedback to the user when the brush time remaining has expired.

* * * * *